M. C. RYPINSKI.
TEMPERATURE INDICATOR.
APPLICATION FILED JAN. 5, 1907

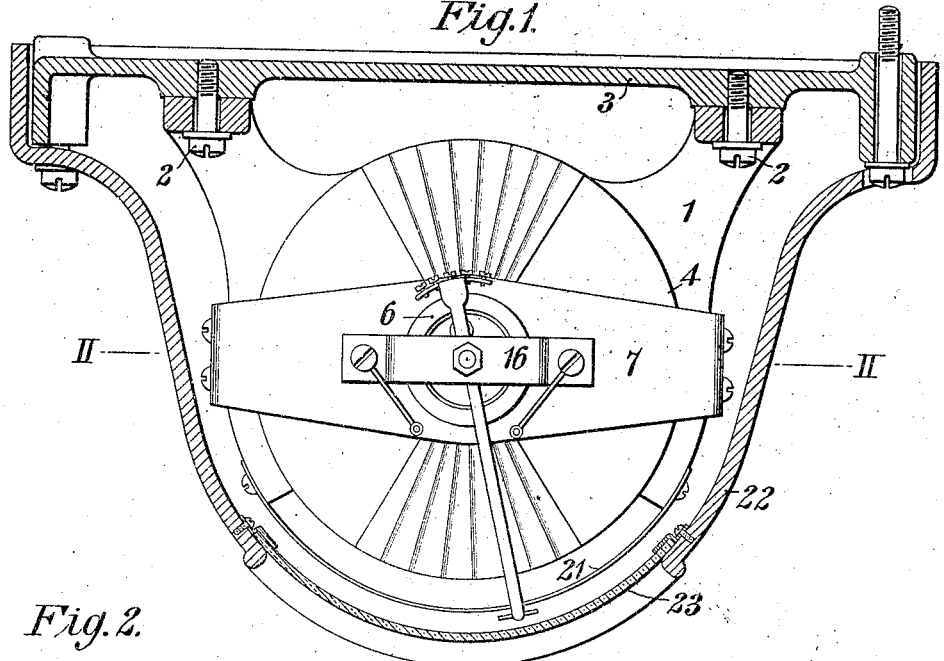
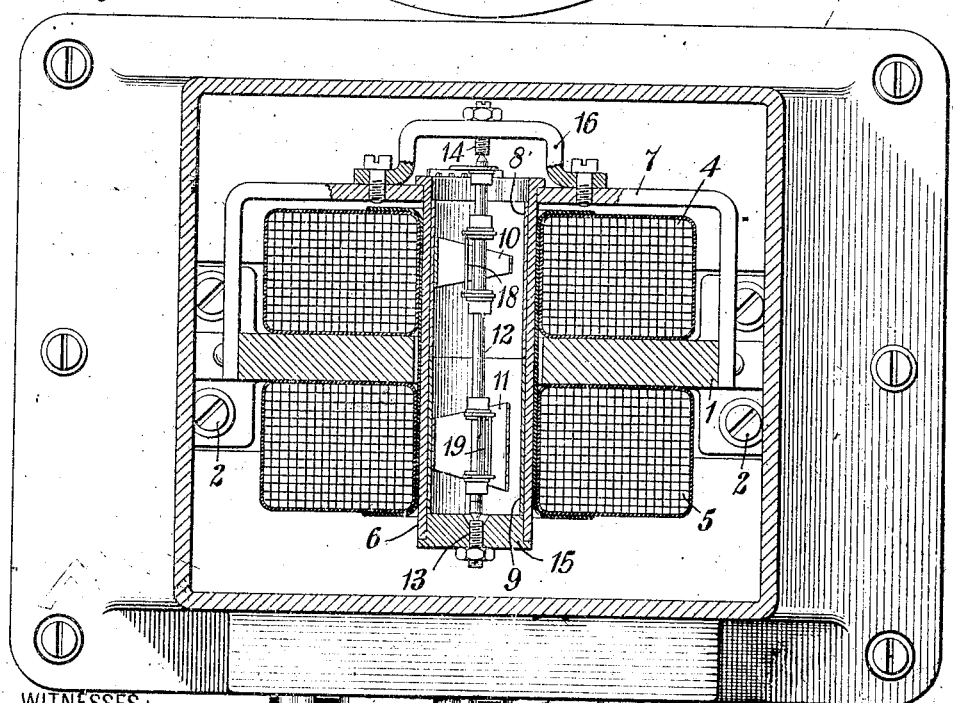

1,108,934.

Patented Sept. 1, 191
2 SHEETS—SHEET 2.

WITNESSES:
C. L. Belcher
Otto S. Schauer

INVENTOR
Maurice C. Rypinski
BY
Wesley G. Carr
ATTORNEY

UNITED STATES PATENT OFFICE.

MAURICE C. RYPINSKI, OF BRADDOCK, PENNSYLVANIA, ASSIGNOR TO WESTINGHOUSE ELECTRIC & MANUFACTURING COMPANY, A CORPORATION OF PENNSYLVANIA.

TEMPERATURE-INDICATOR.

1,108,934.  Specification of Letters Patent.  Patented Sept. 1, 1914.

Application filed January 5, 1907. Serial No. 350,964.

*To all whom it may concern:*

Be it known that I, MAURICE C. RYPINSKI, a citizen of the United States, and a resident of Braddock, in the county of Allegheny and State of Pennsylvania, have invented a new and useful Improvement in Temperature-Indicators, of which the following is a specification.

My invention relates to temperature indicators, and it has for its object to provide means whereby the temperature of inaccessible parts or places may be accurately and directly indicated.

In the use of electrical and other devices in which heat is generated during operation, it is frequently desirable to know, at all times, the temperatures of inaccessible parts thereof in order that safe operating temperatures may not be exceeded or in order that other conditions may be determined and regulated.

It is, of course, well known that the electrical resistances of many materials vary with the temperature and that temperatures may consequently be determined by measuring the resistances of circuits having known temperature co-efficients. Such a method, however, is cumbersome and undesirable because of its indirectness, and the present invention accordingly provides a means that is dependent in operation upon the difference of the resistances of two circuits and whereby absolute temperatures or differences in temperature may be indicated directly.

The invention is claimed broadly in an application, Serial No. 350,968, filed by Frank Conrad of even date herewith, and assigned to the Westinghouse Electric & Manufacturing Company, the claims in this application being to a specific structure.

Figure 3:
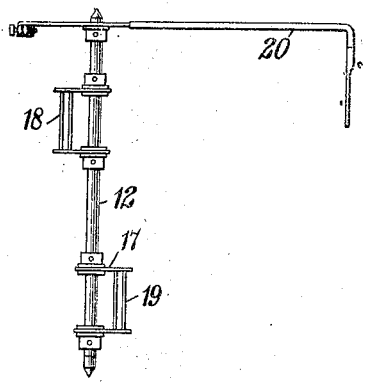
Figure 4:
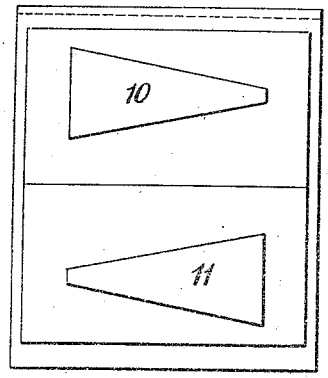
Figure 5:
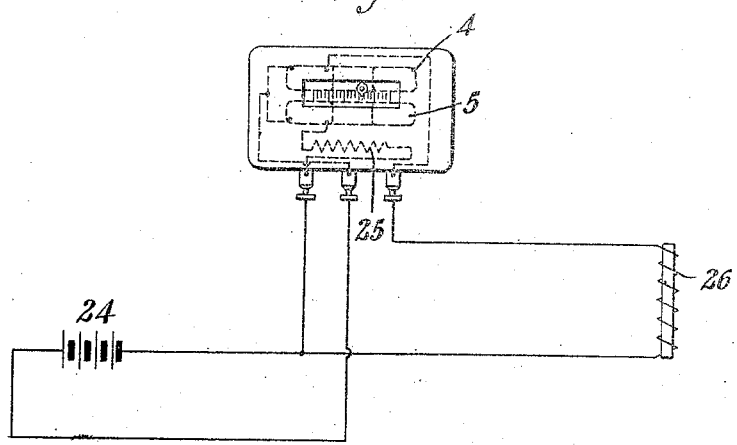

Figure 1 of the accompanying drawings is a plan view of an instrument that embodies my invention, the casing being shown in section. Fig. 2 is a sectional view of the instrument on the line II—II of Fig. 1. Fig. 3 is a view, in elevation, of the movable element of the instrument. Fig. 4 shows certain parts of the instrument developed into a plane, and Fig. 5 is a diagrammatic view of the circuit arrangements of the instrument.

Mounted upon opposite sides of a magnetizable supporting bracket 1, that is secured by means of tap screws 2 to the base or back 3 of the instrument, are two coils 4 and 5 surrounding a brass or other non-magnetizable cylindrical shell 6 that is supported by means of a bracket 7 the ends of which are secured to the bracket 1. Within the cylindrical shell 6 are two other non-magnetizable cylindrical shells 8 and 9 of substantially equal diameters, upon the inner faces of which are secured cylindrically curved core members 10 and 11 consisting of rolled or bent strips of magnetizable sheet material that vary in width from end to end. As indicated in Fig. 4, the core members 10 and 11 are reversely disposed as regards their narrow and wide ends, and the contiguous ends of the two members are substantially in alinement. A shaft 12 is rotatably and axially supported within the cylinders 8 and 9 by means of bearings 13 and 14 that are mounted, respectively, in a cap or plug 15 at the lower end of the cylinder 6 and in a bracket 16 that is mounted upon the bracket 7. The shaft 12 is provided with two pairs of oppositely projecting, non-magnetizable arms 17, and between the respective pairs of these arms are mounted sets of magnetizable rods 18 and 19 that constitute movable core members for the coils 4 and 5 and are disposed adjacent to the respective members 10 and 11. The shaft 12 also carries a needle or pointer 20 that is movable over the face of a graduated scale 21 located behind an opening in a cover 22 in which a piece of glass 23 may be secured. The coils 4 and 5 are connected in parallel relation between the terminals of a suitable source, such as a battery 24, resistance devices 25 and 26 being interposed in the respective circuits, the latter device being composed of a material, such as copper, having a comparatively high temperature co-efficient, in order that its resistance may vary with the temperature. If it is desired to employ the instrument for the purpose of indicating absolute temperatures, the resistance device 25 should be composed of a material having zero or a substantially negligible temperature co-efficient in order that its resistance may not vary with the temperature, though, for most practical purposes, German silver will be found suitable in place of more expensive and less readily obtainable materials, since its temperature co-efficient is very low. If, however, it is desired that the instrument should indicate only differences in temperature, the resistance device 25 should be composed of a material having substantially the same temperature co-efficient as that of which the resistance device 26 is composed.

In practice, the resistance device 26 will be placed adjacent to the parts, or in the location, the temperature of which it is desired to ascertain, while the resistance device 25 will ordinarily be included in the instrument, as a part of it. In the operation of the instrument, the stationary and movable core members of each coil are similarly magnetized in order that the movable members shall be repelled toward the smaller ends of the corresponding stationary members, in which directions the repulsive forces diminish until they become balanced. If the resistance of the device 26 is varied by reason of variations in temperature, the strength of the field produced by the coil 4 will be correspondingly varied to effect a variation in the force of repulsion between the members 18 and 10. A variation in the resistance of the device 26 also causes a variation in the strength of the field produced by the coil 5 and a corresponding variation in the force of repulsion between the members 19 and 11, because the coils 4 and 5 and their respective resistance devices are in parallel circuits. Since any increase in the field strength of coil 4, by reason of a decrease in the resistance of the device 26 is accompanied by a corresponding decrease in the field strength of the coil 5, and vice versa, the balanced relation of the repulsive forces will obtain when the members 18 and 19 assume a new position that corresponds to the change in the temperature to which the device 26 is subjected. The adjusted position, and, consequently, the temperature to be measured will be indicated on the scale 21 by the pointer 20.

I claim as my invention:

1. The combination with magnet windings, of core members for the respective windings consisting of cylindrically curved plates of varying width from end to end and reversely disposed, and other core members that are rigidly connected together and are relatively movable with respect and adjacent to the aforesaid members.

2. The combination with magnet windings, of core members for the respective windings consisting of cylindrically curved plates of varying widths from end to end and reversely disposed, and other core members that are relatively movable with respect thereto.

3. The combination with a pair of windings connected to be energized in parallel, of a pair of cylindrically curved stationary core plates of varying width from end to end and reversely disposed, and a pair of rigidly connected movable core members that are inductively related to said core plates.

4. The combination with a pair of coils connected to be energized in parallel and having cylindrically curved core plates of varying width from end to end and reversely disposed, of a rotatable shaft and a pair of core members mounted thereon in inductive relation to said core plates.

5. The combination with a pair of axially alined coils connected to be energized in parallel and having cylindrically curved core plates of varying width from end to end and reversely disposed, of a rotatable shaft and a pair of oppositely disposed core members mounted thereon in inductive relation to said core plates.

In testimony whereof, I have hereunto subscribed my name this 26th day of December, 1906.

MAURICE C. RYPINSKI.

Witnesses:
H. C. MODE,
BIRNEY HINES.